Dec. 14, 1937.  G. A. LYON  2,102,468
COMBINATION TIRE COVER AND HUB GUARD
Filed Jan. 2, 1932
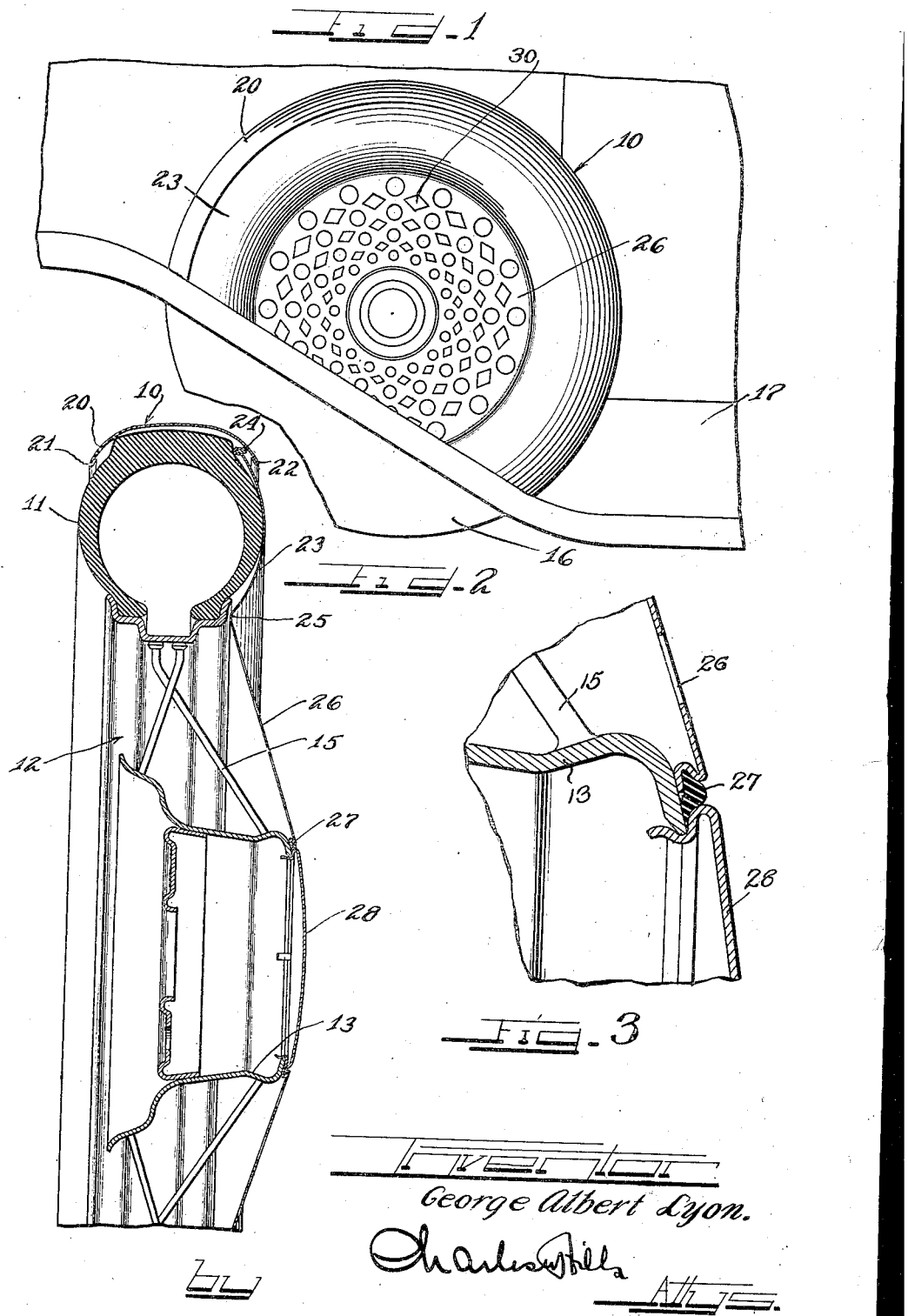
Inventor
George Albert Lyon.

Patented Dec. 14, 1937

2,102,468

UNITED STATES PATENT OFFICE 2,102,468

COMBINATION TIRE COVER AND HUB GUARD

George Albert Lyon, Allenhurst, N. J., assignor to Lyon Incorporated, Asbury Park, N. J., a corporation of Delaware Application January 2, 1932, Serial No. 584,561

4 Claims. (Cl. 150—54)

This invention relates to tire covers for spare tires of automobiles and more particularly to an improvement in my well-known multi-part tire cover of the type disclosed in my U. S. Letters Patent No. 1,807,697 which issued June 2, 1931.

It is the aim of this invention to provide my multi-part tire cover of the type disclosed in my aforesaid Letters Patent with a central disc-like portion connected to the side plate part of the cover and arranged to bridge the distance between that part and the hub of the spare wheel on which the cover is carried.

Another object of my invention is to provide an automobile spare tire cover with means for covering the spokes of the spare wheel carrying the tire on which the cover is disposed.

In accordance with the general features of this invention, there is provided a two-part tire cover including a rim part for disposition over the outer periphery of the tire and a side plate part for disposition over the outer side wall of the tire, this latter part being provided with an inwardly extending and outwardly slanting circular disc-like portion for bridging the distance between the tire and the hub of the wheel and for acting as a guard to protect the spokes of the spare wheel.

Other objects and features of this invention will more fully appear from the following detail description taken in connection with the accompanying drawing which illustrates a single embodiment thereof and in which—

Figure 1 is a side view of my novel tire cover showing it applied to a spare wheel in a fender well in an automotive vehicle;

Figure 2 is an enlarged fragmentary sectional view taken through the wheel and cover shown in Figure 1; and Figure 3 is an enlarged view of a portion of Figure 2 showing the manner in which the hub cap cooperates with the center of the cover.

On the drawing:

The reference character 10 designates generally my novel tire cover which is illustrated as being applied to a spare tire 11 carried by a spare wheel 12 including a hub 13 and spokes 15.

The spare tire and cover are illustrated as being disposed in the fender well 16 of an automotive vehicle 17.

The cover 10 of my invention embodies a split rim for disposition over the tread or outer periphery of the tire, which rim is designated by the reference character 20. This rim is of convexly curved cross section and has its marginal edges turned as indicated at 21 and 22. Furthermore, this rim like the split rim of the tire cover disclosed in my aforesaid Letters Patent is adapted to be snapped over the periphery of the tire and to thereafter contract on account of its own inherent resiliency. It will of course be appreciated that due to the inherent resiliency of the metallic material composing the rim 20 it has a tendency to contract after it has been expanded and furthermore it is so formed that it will at all times have a tendency to contract to a diameter less than the normal diameter of the outer periphery of the tire to which it is applied. This split rim is arranged to cooperate with a side plate part 23 to hold the side plate part in proper tire protecting position on the outer side wall of the spare tire 11. This side plate part 23 is also of convexly curved cross-section and is of a ring-like shape. The outermost peripheral edge of this part 23 carries a rubber bead or cushion member 24 for yieldably engaging the inner surface of the rim 20 when the rim is thereover. It is this pad 24 which acts as a cushion between the two parts so as to prevent rattling of the parts.

The innermost marginal portion 24 of this ring part 23 is connected to and forms a junction 25 with the disc-like portion 26 which embodies the features of this invention.

This disc-like portion 26 extends inwardly and outwardly from the plate part 23 and terminates at its innermost edge in a ring-like bead 27 of such diameter as to enable it to engage under the outermost periphery of a hub cap 28 disposed on the hub 13 of the wheel. This arrangement enables the hub cap to cooperate in holding the innermost edge of the disc-like portion 26 in proper position with respect to the wheel.

The disc-like portion 26 is perforated as will be evident from Figure 1 and these perforations which are designated by the reference character 30 may be of any suitable or fanciful design.

The disc-like portion 26 serves as a guard between the tire cover and the hub cap of the wheel in that it protects the spokes 15 of the wheel 12.

Now it will of course be appreciated that while I have illustrated and described in detail the preferred embodiment of the invention, the invention is not to be thus limited but only insofar as defined by the scope and spirit of the appended claims.

I claim as my invention:

1. As an article of manufacture, a side plate part for use in a multi-part tire cover including a convexly curved ring-like portion for disposition over the outer side wall of a spare tire and an inwardly extending and outwardly slanting disc-like portion for covering the spokes of the wheel carrying the tire to which the cover is applied, said disc-like portion having a central opening defined by a marginal turned edge formed to engage under a wheel hub cap.

2. As an article of manufacture, a side plate part for use in a multi-part tire cover including a convexly curved ring-like portion for disposition over the outer side wall of a spare tire and an inwardly extending and outwardly slanting disc-like portion for covering the spokes of the wheel carrying the tire to which the cover is applied, said disc-like portion having a central opening defined by a marginal turned edge formed to engage under a wheel hub cap, said disc-like portion being perforated and provided with centrally disposed retaining means formed for cooperation with the wheel hub.

3. In a tire cover, a ring-like plate formed for disposition over only a side of the tire and having its outer peripheral edge formed to extend inwardly toward the tread of the tire for frictional cooperation with another part of the tire cover, said ring-like part having connected to it a central disc-like guard formed to extend between the plate and a wheel hub cap and having its inner margin formed for retaining cooperation with the wheel hub cap and its outer margin terminating in said part inwardly of the tire.

4. In a multi-part tire cover, disc-like means connected to the cover of such width as to extend between the cover and the hub cap of the wheel on which the cover is disposed, said disc-like means comprising an annular plate and having its inner marginal edge formed for retaining engagement with the wheel hub cap and having its outer margin connected to the cover inwardly of the cover.

GEORGE ALBERT LYON.